United States Patent
Klumpe et al.

(10) Patent No.: US 7,164,048 B2
(45) Date of Patent: Jan. 16, 2007

(54) HIGH-PURITY POLYALKYLENE GLYCOLS AND PREPARATION THEREOF

(75) Inventors: Markus Klumpe, Mannheim (DE); Kai-Uwe Baldenius, Ludwigshafen (DE); Claus Hackmann, Kirchheim (DE); Arnulf Lauterbach, Ludwigshafen (DE); Hans-Peter Seelmann-Eggebert, Limburgerhof (DE); Matthias Zipplies, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 408 days.

(21) Appl. No.: 10/857,915

(22) Filed: Jun. 2, 2004

(65) Prior Publication Data

US 2005/0009695 A1    Jan. 13, 2005

(30) Foreign Application Priority Data

Jun. 3, 2003  (DE) ................................. 103 25 264
Aug. 26, 2003  (DE) ................................. 103 39 184

(51) Int. Cl.
*C07C 29/74*  (2006.01)
*C07C 29/36*  (2006.01)

(52) U.S. Cl. ...................... 568/868; 568/866; 568/867; 568/869

(58) Field of Classification Search ................ 568/868, 568/869, 866, 867
See application file for complete search history.

(56) References Cited

U.S. PATENT DOCUMENTS 4,946,939 A    8/1990    Murphy et al.
5,235,114 A    8/1993    Reisch et al.

FOREIGN PATENT DOCUMENTS

EP    0 400 554    12/1990
EP    1 245 608    10/2002

OTHER PUBLICATIONS

Chemical Abstract, RO 114124, Jan. 29, 1999.
Chemical Abstract, CN 1132194, Oct. 2, 1996.
Chemical Abstract, RO 62314, Apr. 25, 1977.
Chemical Abstract, JP 53-046907, Apr. 27, 1978.
Chemical Abstract, RD 372014, Apr. 10, 1995.

*Primary Examiner*—Elvis O. Price
(74) *Attorney, Agent, or Firm*—Oblon, Spivak, McClelland, Maier & Neustadt, P.C.

(57) ABSTRACT

A process is described for purifying polyalkylene glycols obtained by adding alkylene oxide to alkylene glycol, in which, after addition is complete, the resultant polyalkylene glycol is treated at a pH of >7 with a bleaching agent selected from the group consisting of peroxides, peracids, percarbonates, perborates, peroxodisulfates or oxygen, in each case with or without addition of a bleaching activator.

The process is suitable in particular for preparing polyethylene glycol having molar weights from 196 to 203 g/mol which meets requirements of pharmacopeias.

13 Claims, No Drawings

HIGH-PURITY POLYALKYLENE GLYCOLS AND PREPARATION THEREOF

The present invention relates to a process for preparing high-purity polyalkylene glycols, in particular polyethylene glycol. According to the invention, the high purity is achieved by treatment with a bleach, preferably an $H_2O_2$ treatment, and starting materials of technical-grade purity can be used. In the most preferred embodiment, the polyethylene glycol has a molar mass of from 190 to 210 g/mol and meets pharmacopeia requirements (called hereinafter PEG 200). The inventive polyalkylene glycols, in particular polyethylene glcyol, are suitable for use in drugs and in nutrition.

Polyoxyalkylene glycols have very highly varied fields of application. In some there are high requirements of purity and color value, for example in those products consumed by humans, as in foods and pharmaceutical products. The polyoxyalkylene glycol most frequently used in these fields is polyethylene glycol PEG.

Examples of polyoxyalkylene glycols comprise polyethylene glycol PEG, polypropylene glycol PPG, and polybutylene glycol PBG, which are prepared from ethylene oxide EO, propylene oxide PO, and butylene oxide BO, respectively. Mixed polymers of EO, PO and/or BuO are also known, for example EO with PO. The mixed polymers can be random polymers or block polymers.

The requirements of PEG used in pharmaceutical products are defined in the most widely differing pharmacopeias, for example the Deutsches Arzneimittelbuch (DAB), the US Pharmacopeia USP and European Pharmacopeia EUP. Thus, in accordance with the USP, a 10% strength aqueous solution of PEG must be clear and colorless, in accordance with EUP the color value may be no more than 20 APHA as a 25% strength solution in water. Other requirements are a maximum sulfate ash content of 0.1%, a maximum content of monoethylene glycol and diethylene glycol together of 0.25%, and a maximum content of EO and 1,4-dioxane of 10 ppm in each case.

To date, only a few processes which can be used on an industrial scale exist which permit high-purity polyoxyalkylene glycols to be prepared from alkylene glycols of technical-grade quality.

One pathway for preparing PEGs is polymerizing ethylene oxide by basic catalysts, for example hydroxides, or alkoxides of alkali metals and alkaline earth metals. In addition an alcohol, generally a certain (poly)ethylene glycol, is added here as a starter, an addition reaction of the ethylene oxide to the starter taking place. Other polyalkylene glycols, for example propylene oxide, may be prepared in another way by adding the corresponding alkylene oxide to corresponding (poly)alkylene glycols.

For the industrial-scale preparation of polyethylene glycols which conform to the high requirements in the food sector or pharmaceutical sector, high-purity starting materials, including polyethylene glycols, are generally used. This requires complex preliminary purification of the starting materials, and is thus cost-intensive.

EP-A 1 245 608 describes the use of triethylene glycol TEG for preparing polyethylene glycols. A PEG is obtained which has a low monoethylene glycol (MEG) content and diethylene glycol (DEG) content; no other details are given with respect to the other requirements. In particular, the color value and EO content of the resultant products are not considered. Furthermore, from the examples it may be inferred that to achieve the low MEG and DEG contents, the drying must be carried out fastidiously. Thus, fundamentally, TEG of very high quality is mixed with solid KOH and the drying is carried out under reduced pressure, with nitrogen additionally being passed through to remove residual water.

RO-B 114 124 describes the purification of PEGs by treatment with hydrogen peroxide in the presence of a strongly acidic ion exchanger. This process has the disadvantage that an additional treatment on a basic ion exchanger must be carried out to remove residual acidity.

CN-A 1 132 194 describes the preparation of polyoxyethylene glycols and their purification by distillation.

RO-A 62 314 describes preparing tetraethylene glycol from TEG and EO under base catalysis. The product must be distilled for purification.

JP-A 53 046 907 describes the catalytic hydrogenation of polyalkylene oxides to reduce the color number in the products.

RD-A 372 014 describes removing coloring components in tetraethylene glycol by hydrogenation over a nickel catalyst with subsequent additional activated carbon purification.

U.S. Pat. No. 4,946,939 describes preparing polyoxyalkylene glycols and their purification by membrane filtration. Disadvantages of this process are the restriction to PEGs from a molar weight of 400 and the complex membrane filtration itself.

It is an object of the present invention to provide a process for preparing polyoxyalkylene glycols, preferably PEGs, and particularly preferably PEG200, which, starting from alkylene glycols of technical-grade quality and addition of the corresponding alkylene oxide, gives the desired products in qualities which satisfy the high requirements of color and purity. The process is to be usable universally. Preferably, the polyoxyalkylene glycols and the PEGs are to satisfy the requirements in the food and pharmaceutical industries. In particular, the requirements stipulated in various pharmacopeias are to be met, for example for PEG200 according to the specification of US Pharmacopeia USP25, which is presented hereinafter.

| Criterion | Required by USP 25 |
|---|---|
| Appearance | clear and colorless |
| Color value | <20 APHA |
| Kinematic viscosity | 3.9–4.8 mm$^2$/s (98.9 ± 0.3° C.) |
| Molar weight | hydroxyl number via phthalic anhydride method 535–590 mg/g; equivalent to M 190–210 g/mol |
| pH | 4.5–7.5 |
| Sulfate ash | max. 0.1% |
| Heavy metals | max. 5 ppm |
| EO/1,4-dioxane | max. 10 ppm each |
| MEG + DEG | in total max. 0.25% |
| Volatile organic compounds | meet requirements with respect to benzene, chloroform, methylene chloride and trichloroethylene |

We have found that this object is achieved by a process for purifying polyalkylene glycols obtained by adding alkylene oxide to alkylene glycols which comprises, after addition is complete, treating the resultant polyalkylene glycol at a pH>7 with a bleaching agent selected from the group consisting of peroxides, peracids, percarbonates, perborates, peroxodisulfates or oxygen, in each case with or without the addition of a bleach activator.

According to the invention, in the addition reaction, the most varied alkylene glycols and polyalkylene glycols can be used as what are termed starters, their use being directed toward the polyoxyalkylene glycols to be obtained.

Examples of suitable starters include monoethylene glycol MEG, diethylene glycol DEG, triethylene glycol TEG, monopropylene glycol MPG, dipropylene glycol DPG, tripropylene glycol TPG, monobutylene glycol and dibutylene glycol.

The addition reaction is generally carried out in the presence of a base catalyst. Suitable base catalysts are known to those skilled in the art and are generally selected from hydroxides and alkoxides of alkali metals and alkaline earth metals. The catalyst is added in an amount of from 0.001 to 5% by weight, preferably from 0.01 to 1% by weight, and particularly preferably from 0.01 to 0.2% by weight. Preferred catalysts are KOH and/or NaOH.

The starter is generally reacted with alkylene oxide in such a manner that starter and catalyst are mixed before the addition of alkylene oxide, if appropriate dried, and brought to the reaction temperature above 80° C. The alkylene oxide is then added.

After the reaction has ended, the bleaching agent is added to the mixture. Preferably this is carried out in the temperature range from 50 to 120° C., particularly preferably from 70 to 100° C. The mixture is then cooled and the reaction mixture discharged from the reactor.

Suitable bleaching agents are known to those skilled in the art. Examples include organic and inorganic peroxides, for example $H_2O_2$, peracids, for example peroxyacetic acid, percarbonates, perborates, peroxodisulfates, and in addition oxygen. Preferred bleaching agents are oxygen or $H_2O_2$. In particular, $H_2O_2$ is used, in general in the form of commercial aqueous solutions, for example 30%.

The mentioned bleaching agents are employed in an amount of 0.05 to 1% by weight, preferably 0.1 to 0.5% by weight, in particular 0.1 to 0.25% by weight, relative to the alkylene glycol. In this case, the bleaching agent is in particular $H_2O_2$, the alkylene glycol is in particular triethylene glycol.

If, in addition, a bleaching activator is used, these are selected from the customary bleaching activators which are known to those skilled in the art. A single bleaching activator or a mixture of two or more can be used. Preferred bleaching activators comprise tetraacetylethylenediamine (TAED), pentaacetylglucose (PAG), Na p-isononanoylbenzenesulfonate (i-NOBS), 1,5-diacetyl-2,4-dioxohexahydro-1,3, 5-triazine (DADHT), tetraacetylglycouril (TAGU), N-nonanoylsuccinimide (NOSI), phthalic anhydride, mixed anhydrides of citric acid and acetic acid, in particular triple acetic anhydrides of citric acid, and Mn salts.

If appropriate, before the described reaction of the alkylene oxide with the starter, the starter and/or catalyst is dried. If a product is to be obtained which has a low residual content of monoalkylene glycol and dialkylene glycol, it is advisable to carry out this step. In particular in the preparation of PEG by adding ethylene oxide to TEG, a very low residual content of MEG and DEG may be achieved by drying.

The drying can be performed by measures known to those skilled in the art, for example by evacuation, passing nitrogen through, azeotropic drying or a combination of 2 or all of said measures. Preferably, the drying is carried out by evacuation and/or passing through nitrogen. It has been found that in particular in the preparation of PEG according to the present invention, drying of the starter and/or catalyst by simple evacuation is completely sufficient.

While the polyalkylene glycol is being treated with the bleaching agent, the pH of the solution is to be >7, preferably from 7.5 to 10.0, in particular from 8.0 to 9.0. In many cases the pH sets itself to said values, since in the course of the addition reaction carboxylic acids are formed, which decrease the pH. Adding a means to lower the pH may be necessary, preferably an acid or an acidic ion exchanger. Preferably, an acid is used, more preferably acetic acid, lactic acid and/or phosphoric acid, in particular acetic acid and/or lactic acid.

The inventive process is suitable for preparing and purifying polyalkylene glycols which are prepared by adding the corresponding alkylene oxide or oxides to a starter, generally with base catalysis. The starter used can be present already in adequate purity. The inventive advantages, however, are more pronounced if starters of technical-grade quality are used. In this case, no, or less complex, purification of the starters is necessary, and despite the lack of prepurification a product of high purity and low color value was obtained.

Preferably, the inventive process is used for preparing PEG of high purity and low color value from starters of technical-grade quality. More preferably, the starter is TEG. If, before the addition, drying is carried out, a PEG is obtained which, in addition to a low color value, has only low amounts of MEG and DEG.

PEG quality grades obtained according to the invention are suitable for use in foods and pharmaceutical products.

In a preferred embodiment, using the inventive process, from ethylene oxide and using TEG as starter, a PEG is prepared which has a molar weight of from 150 to 500 g/mol, preferably from 190 to 300 g/mol, more preferably from 190 to 210 g/mol, and in particular from 196 to 203 g/mol. Within this embodiment, more preferably, the PEG has a residual content of MEG and DEG together of <0.25% by weight, in particular together of <0.05% by weight. Even more preferably, the above-specified PEG has a residual ethylene oxide content of <10 ppm and a 1,4-dioxane content of <10 ppm, particularly preferably a residual ethylene oxide content of <0.5 ppm and a residual 1,4-dioxane content of <2 ppm.

In the most preferred embodiment, the inventive process is used to prepare PEG from ethylene oxide using TEG as starter, the PEG having a molar weight of from 196 to 203 g/mol (determined via hydroxyl number by the phthalic anhydride method from USP 25), a residual content of MEG and DEG together of $\leqq$0.05% by weight, a residual ethylene oxide content of <0.5 ppm and a 1,4-dioxane content of <2 ppm, a kinematic viscosity from 3.9 to 4.8 mm$^2$/s at 98.9±0.3° C., and a 25% strength by weight aqueous solution of PEG 200 is clear and colorless and has a color value <20 APHA.

In the preparation of PEG, the inventive process permits the use of starters having carbonyl contents of from >25 ppm up to 100 ppm.

According to the invention, color values <20 APHA may be achieved without problems, as a result of which a corresponding PEG meets the requirements as under USP and/or European Pharmacopeia.

The polyalkylene glycols according to the invention, in particular the polyethylene glycol, lend themselves for the use in the fields of pharmaceuticals, nutrition and food supplement, for humans and animals.

EXAMPLES

The molar masses of the resultant products were determined via hydroxyl number using the phthalic anhydride method from USP 25.

Example 1

600 g (4 mol) of triethylene glycol are mixed with 0.30 g of potassium hydroxide solution 40% strength (0.015% by weight, based on product) and dried for 30 min at 80° C./<10 mbar. Then, the product is reacted at 150° C. with 200.6 g (4.56 mol) of ethylene oxide. Discharge 804 g, color value: 15 APHA (25% strength by weight in water).

500 g of the output are set to pH 7.4 with 0.064 g of acetic acid, 0.94 ml of 50% strength by weight hydrogen peroxide is added and the mixture is heated for 1 hour at 80° C. The mixture is then stripped with 35 g of water at 100° C./15 mbar and the product is packaged.

| | |
|---|---|
| Appearance: | colorless |
| Color value: | 1 APHA (25% strength by weight in water) |
| Hydroxyl number: | 564 mg/g |
| Viscosity: | 4.106 mm$^2$/s at 98.9° C. |
| pH: | 4.5 |
| EO content: | <0.5 ppm |
| 1,4-Dioxane content: | <2 ppm |
| Total MEG/DEG: | 0.05% by weight |
| Water: | 0.15% by weight |

Example 2

600 g (4 mol) of triethylene glycol are mixed with 0.30 g of potassium hydroxide solution 40% strength (0.015% by weight based on product) and dried for 40 min at 80° C./<10 mbar. The mixture is then reacted at 150° C. with 200.6 g (4.56 mol) of ethylene oxide. Output 798 g, color value: 17 APHA (25% strength in water).

500 g of the output are set to pH 8.1 with 0.06 g of acetic acid, 0.94 ml of hydrogen peroxide 50% strength by weight is added and the mixture is heated for 1 hour at 80° C. The mixture is then stripped at 100° C./15 mbar with 35 g of water and the product is packaged.

| | |
|---|---|
| Appearance: | colorless |
| Color value: | 5 APHA (25% strength by weight in water) |
| Hydroxyl number: | 564 mg/g |
| Viscosity: | 4.126 mm$^2$/s at 98.9° C. |
| pH: | 5.4 |
| EO content: | <0.5 ppm |
| 1,4-Dioxane content: | <2 ppm |
| Total MEG/DEG: | 0.05% by weight |
| Water: | 0.15% by weight |

Example 3

600 g (4 mol) of triethylene glcyol are mixed with 0.30 g of potassium hydroxide solution 40% strength (0.015% by weight based on product) and dried at 80° C./<10 mbar for 30 min. The mixture is then reacted with 200.6 g (4.56 mol) of ethylene oxide at 150° C. Output 803 g, color value: 13 APHA (25% strength by weight in water).

500 g of the output are set to pH 8.4 with 0.065 g of acetic acid, 0.94 ml of hydrogen peroxide 50% strength by weight is added and the mixture is heated to 80° C. for 1 hour. The mixture is then stripped at 100° C./15 mbar with 35 g of water and the product is packaged.

| | |
|---|---|
| Appearance: | colorless |
| Color value: | 3 APHA (25% strength by weight in water) |
| Hydroxyl number: | 564 mg/g |
| Viscosity: | 4.107 mm$^2$/s at 98.9° C. |
| pH: | 4.7 |
| EO content: | <0.5 ppm |
| 1,4-Dioxane content: | <2 ppm |
| Total MEG/DEG: | 0.05% by weight |
| Water: | 0.15% by weight |

Example 4

600 g (4 mol) of triethylene glycol are mixed with 0.30 g of potassium hydroxide solution 40% strength (0.015% by weight based on product) and the mixture is dried at 80° C./<10 mbar for 45 min. The mixture is then reacted with 200.6 g (4.56 mol) of ethylene oxide at 150° C. Output 797 g, color value: 65 APHA (25% strength by weight in water).

300 g of the output are admixed with 0.02 g of acetic acid and 0.56 ml of hydrogen peroxide 50% strength and heated at 80° C. for 1 hour. The mixture is then stripped at 100° C. for 15 mbar with 21 g of water and the product is packaged.

| | |
|---|---|
| Appearance: | colorless |
| Color value: | 17 APHA (25% strength by weight in water) |
| pH: | 5.4 |

Example 5

600 g (4 mol) of triethylene glycol are mixed with 0.30 g of potassium hydroxide solution 40% strength (0.015% by weight based on product) and dried at 80° C./<10 mbar for 45 min. The mixture is then reacted with 200.6 g (4.56 mol) of ethylene oxide at 150° C. Output 799 g, color value: 21 APHA (25% strength by weight in water).

600 g of the output are set to pH 9.5 with 0.04 g of acetic acid. 300 g thereof are admixed with 0.564 ml of hydrogen peroxide 50% strength by weight and heated at 80° C. for 1 hour. The mixture is then stripped at 100° C./15 mbar with 21 g of water and the product is packaged.

| | |
|---|---|
| Appearance: | colorless |
| Color value: | 10 APHA (25% strength by weight in water) |
| pH: | 5.2 |

The other 300 g are admixed with 0.28 ml of hydrogen peroxide 50% strength by weight and heated at 80° C. for 1 hour. The mixture is then stripped at 100° C./15 mbar with 21 g of water and the product is packaged.

| | |
|---|---|
| Appearance: | colorless |
| Color value: | 15 APAHA (25% strength by weight in water) |
| pH: | 6.1 |

Example 6

79 kg (53 mol) of triethylene glycol are mixed with 35 g of potassium hydroxide solution 45% strength and dried at 120° C./<20 mbar for 25 min. The mixture is then reacted with 26.5 kg (60 mol) of ethylene oxide at 150° C. The batch is set to pH 9.2 with 7 g of acetic acid, admixed with 199 g of hydrogen peroxide 50% strength by weight and stirred at 80° C. for 1 hour. The mixture is then stripped at 100° C./<20 mbar with 7.35 kg of water and the product is packaged.

| | |
|---|---|
| Appearance: | colorless |
| Color value: | 5 APHA (25% strength by weight in water) |
| Hydroxyl number: | 557.6 mg/g |
| Viscosity: | 4.455 mm$^2$/s at 98.9° C. |
| pH: | 5.3 |
| EO content: | <0.5 ppm |
| 1,4-Dioxane content: | <2 ppm |
| Total MEG/DEG: | 0.01% by weight |
| Water: | 0.13% by weight |

Example 7

79 kg (53 mol) of triethylene glycol are mixed with 35 g of potassium hydroxide solution 45% strength and dried at 120° C./<20 mbar for 25 min. The mixture is then reacted with 26.5 kg (60 mol) of ethylene oxide at 150° C. The batch is set to pH 7.2 with 13 g of acetic acid (color value of a sample: 53 APHA; 25% strength by weight in water). The mixture is then set to pH 8.6 with 9 g of potassium hydroxide, admixed with 99 g of hydrogen peroxide 50% strength by weight and stirred at 80° C. for 1 hour. The mixture is then stripped at 100° C./<20 mbar with 7.35 kg of water and the product is packaged.

| | |
|---|---|
| Appearance: | colorless |
| Color value: | 5 APHA (25% strength by weight in water) |
| Hydroxyl number: | 560 mg/g |
| Viscosity: | 4.486 mm$^2$/s at 98.9° C. |
| pH: | 6.3 |
| EO content: | <0.5 ppm |
| 1,4-Dioxane content: | <2 ppm |
| Total MEG/DEG: | 0.05% by weight |
| Water: | 0.20% by weight |

We claim:

1. A process for purifying polyalkylene glycols obtained by adding alkylene oxide to alkylene glycol which comprises, after addition is complete, treating the resultant polyalkylene glycol at a pH of >7 with a bleaching agent selected from the group consisting of organic and inorganic peroxides, peracids, percarbonates, perborates, peroxodisulfates or oxygen, in each case with or without the addition of a bleaching activator.

2. A process as claimed in claim 1, wherein the treatment with the bleaching agent is carried out at a temperature from 50 to 120° C.

3. A process as claimed in claim 1, wherein $H_2O_2$ is used as bleaching agent.

4. A process as claimed in claim 1, wherein the treatment with the bleaching agent is carried out at a pH from 7.5 to 10.0.

5. A process as claimed in claim 4, wherein the treatment is carried out at a pH from 8.0 to 9.0.

6. A process as claimed in claim 1, wherein the pH is set by adding an acid or an ion exchanger.

7. A process as claimed in claim 1, wherein the addition of the alkylene oxide to the alkylene glycol is carried out in the presence of a base catalyst selected from the group of hydroxides and alkoxides of alkali metals and alkaline earth metals.

8. A process as claimed in claim 1, wherein the resultant polyalkylene glycol is polyethylene glycol.

9. A process as claimed in claim 8, wherein the alkylene glycol used in the addition is triethylene glycol.

10. A process as claimed in claim 9, wherein the triethylene glycol is dried before the addition reaction.

11. A process as claimed in claim 8, wherein the polyethylene glycol obtained in this manner has a molar weight of from 150 to 500 g/mol.

12. A process as claimed in claim 9, wherein the polyethylene glycol obtained has a molar weight from 196 to 203 g/mol.

13. A process according to claim 1, wherein the bleaching agent is employed in an amount of 0.05 to 1% by weight, relative to the alkylene glycol.

* * * * *